2 Sheets—Sheet 1.

E. M. & M. L. KISSELL.

WHEEL-CULTIVATORS.

No. 7,833. Reissued Aug. 7, 1877.

Witnesses;
Chas. M. Peck
Wm Ritchie

Inventors;
Emanuel M. Kissell
Martin L. Kissell
by their Attys.
Peck & Co.

N. PETERS, PHOTO-LITHOGRAPHER, WASHINGTON, D. C.

2 Sheets—Sheet 2.

E. M. & M. L. KISSELL.

WHEEL-CULTIVATORS.

No. 7,833. Reissued Aug. 7, 1877.

Witnesses;
Chas. M. Peck
Wm Ritchie

Inventors;
Emanuel M. Kissell
Martin L. Kissell
by their Attys
Peck & Co.

N. PETERS, PHOTO-LITHOGRAPHER, WASHINGTON, D. C.

UNITED STATES PATENT OFFICE.

EMANUEL M. KISSELL AND MARTIN L. KISSELL, OF SPRINGFIELD, OHIO.

IMPROVEMENT IN WHEEL-CULTIVATORS.

Specification forming part of Letters Patent No. 177,853, dated May 23, 1876; Reissue No. 7,833, dated August 7, 1877; application filed July 18, 1877.

*To all whom it may concern:*

Be it known that we, EMANUEL M. KISSELL and MARTIN L. KISSELL, of Springfield, in the county of Clarke and State of Ohio, have invented certain new and useful Improvements in Wheel-Cultivators, of which the following is a specification:

Our invention relates to that class of cultivators which can be used either as walking or riding-plows, and in which the width and depth of cultivation can be regulated, and the plow-beams hung up when not desired for use or in transporting the implement.

Our improvements consist in forming a self-braced triangular plow-beam frame; in the construction and application of the "hang-up" hooks; in the combination and arrangement of the devices for supporting and adjusting the plow-beams; in the novel application of a draft-bar and its combination with the double-tree, and in other details, all as will be herewith set forth and specifically claimed.

Figure 1:
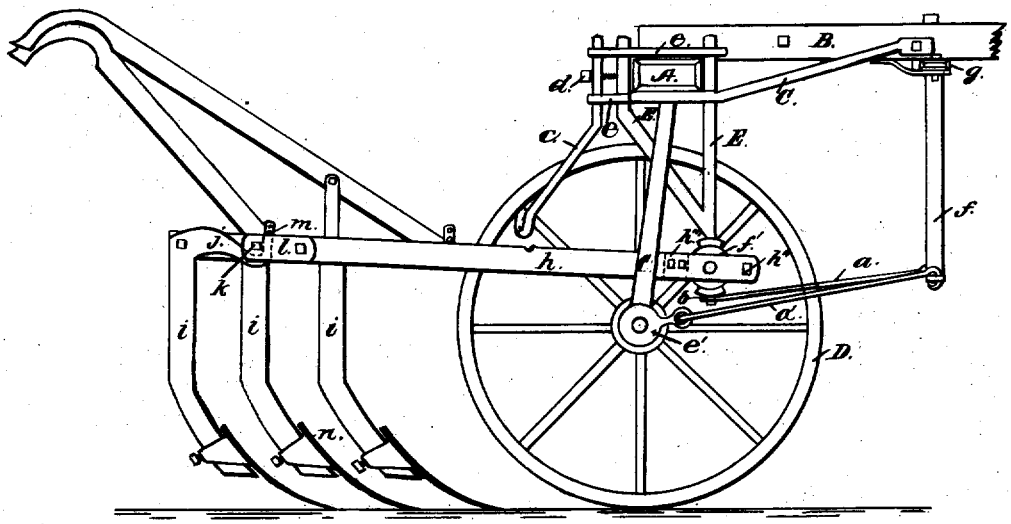
Figure 2:
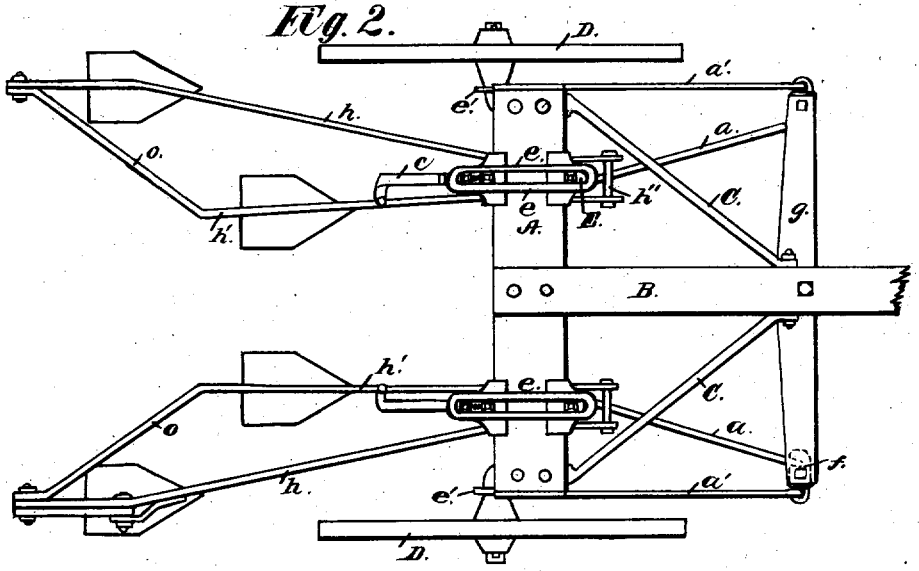
Figure 3:
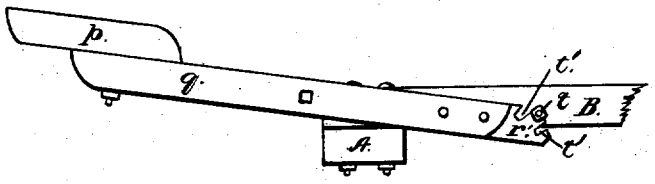
Figure 4:
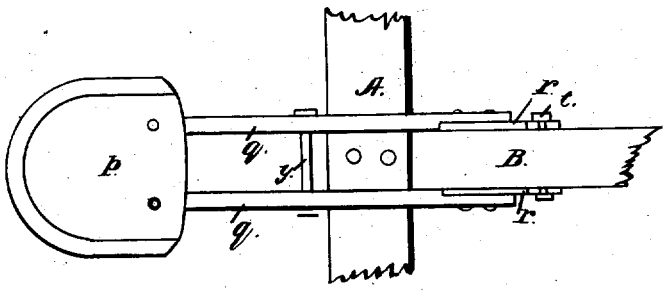

In the accompanying drawings, Figure 1, Sheet 1, is a side elevation of our improved cultivator, with a wheel removed to clearly exhibit the operating devices. Fig. 2, Sheet 1, is a plan view of the same. Fig. 3, Sheet 2, is a side elevation of the seat and its attachments, showing sections of the cross-bar and tongue. Fig. 4, Sheet 2, is a plan view of the same.

The elevated axle or cross-bar A is rigidly bolted to the rear of the tongue B, and metal brace-rods C, connecting both, as represented, descend from the ends of the axle and have their ends bent into stub-axles, on which the carriage-wheels D revolve. Upon the elevated axle we employ the draft-posts E, patented to us September 22, 1874, there being no essential difference between them and the ones referred, to except that the present ones are made longer, to extend below the disk-plates of the clevis far enough to receive the hooked ends of the draft-rods *a*, which are secured by a key or pin, *b*, through the end of the post below it.

In Figs. 1 and 2, *c c* are the hooks on which the plow beams or frames carrying their gangs of plows are hung. These are downward elongations of the block-nuts through which the clamp-screws *d* are inserted. In this improvement it forms the connecting-block for the links *e e*, above and below the cross-bar, the nut for the screws *d*, and the bearing or hang-up hooks for the plows. *a* and *a'*, on each side, are the two draft-rods, of which the ones *a'* are connected with collars *e'*, upon the stub-axles, as shown in Fig. 1. The forward ends of both sets of rods are linked into holes in the horizontally-bent lower portion of the draft-bars *f*. These latter are suspended from ring-bolts in the ends of the double-tree *g*, as represented. The two plow-beams of each set are represented by *h h'*, and are flat-metal bars that in front are pivoted to the clevis-plates *f'*, and are bolted together on both sides thereof, as shown at *h'' h'''*. These beams diverge from the rear bolt, and the inner bar *h'* is bent at an obtuse angle, and is united at its rear end to the rear end of the bar *h* by a bolt, thus giving the frame a triangular shape, as represented. This beam-frame, it will be observed, is thus self-braced, and we are enabled to dispense with extraneous connecting-pieces, and produce a much stronger frame than any employing coupling-pieces.

The standards *i* are angular, having each a limb, *j*, extending forward along the side bars of the beam-frame. The limb *j* is curved in sickle-shape, passing partially around the bolt *k*, up through a recess formed by the overlapping plate *l*, which is bolted to the side bar of the beam-frame, with its end overlapping the limb to keep it in line, and extending above the side-bar, so as to allow of one or more holes through its end for a wooden safety-pin, *m*, which is preferably located above the beam-frame, so that it can be readily seen by the operator, and the team stopped immediately upon its breaking.

In Fig. 1 an intermediate or fifth shovel, *n*, is shown. Its standard is secured to the short or brace side *o* of the beam-frame. This shovel is only used when a more thorough pulverizing of the soil is required than in ordinary cultivation. The block of wood used to stiffen the beam-frame is inserted between bars *h* and *h'*, just behind the clevis, and is secured thereto by through-bolts. (Dotted lines, Fig. 1.)

In Figs. 3 and 4, Sheet 2, *p* is a seat bolted upon the ends of two parallel bars, *q*. Their forward ends are made adjustable by the notched plates *r'*, which form their terminals, being bolted to the inner sides of their front ends.

The axle or cross-bar A forms a bearing for the seat-bars *q* when in position, as shown, the forward ends catching under the end of the bolt *t*, which drops into notches *t'* in the plates *r'*, on each side of the tongue B. The two seat-beams *q* straddle the tongue B, and are held in their parallel position by a through-bolt and nut, *y*. Pieces of rubber in the form of block-springs can be laid on the cross-bar A for bearings for the bars *q*, to ease the driver's weight and overcome the rigidity of the seat.

Having thus fully described our invention, we claim as new and desire to secure by Letters Patent—

1. The plow-beam frame composed of the bars *h h'*, bolted together at their forward ends, and self-braced in the rear by the bent angular portion of the bar *h'*, substantially as shown, and for the purpose specified.

2. In combination with the draft-post E and rod *a* of a wheel-cultivator, the frame-bars *h h'*, clevis-plates *f'*, and connecting-bolt *h'''*, as shown and specified.

3. The combination, with the laterally and vertically adjustable draft-posts E, of the hooked bars *c*, attached thereto, so as to be adjusted laterally with the posts, and always occupy a relative position with the plow-beam frame, substantially as set forth.

4. The combination of the hooked bars *c*, posts E, links *e*, set-screws *d*, and the elevated axle of a wheel-cultivator, substantially in the manner and for the purpose specified.

5. The suspended draft-bar *f*, provided with a T head for the purpose of allowing of two separate points of attachment thereto for the draft-rods by their front ends, in order to equalize the draft, substantially in the manner specified.

6. The draft-bar *f*, provided with a T head, in combination with the double-tree and draft-rods, to form separate means of attachment to the wheel-spindle and plow-beam, as shown and described.

Witness our hands this 12th day of June, A. D. 1877.

EMANUEL M. KISSELL.
MARTIN L. KISSELL.

Witnesses:
CHAS. M. PECK,
J. S. CHRISTIE.